UNITED STATES PATENT OFFICE.

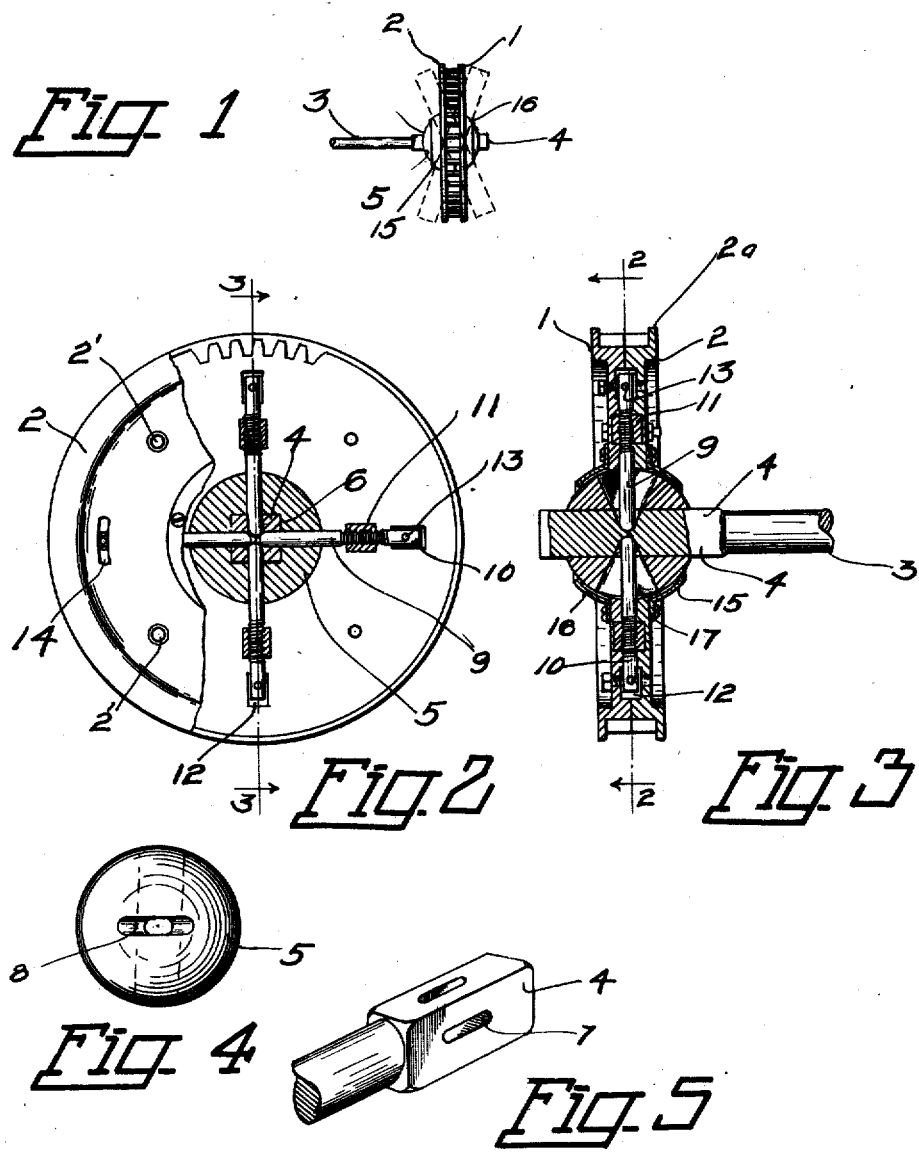

JOHN L. FLORIN, OF DAVENPORT, WASHINGTON.

GEAR WHEEL.

1,422,351.  Specification of Letters Patent.  Patented July 11, 1922.

Application filed April 21, 1921. Serial No. 463,249.

*To all whom it may concern:*

Be it known that I, JOHN L. FLORIN, a citizen of the United States, residing at Davenport, in the county of Lincoln and State of Washington, have invented certain new and useful Improvements in Gear Wheels, of which the following is a specification.

My present invention relates to improvements in gear wheels and particularly to that type having a flexible or tumbling shaft connection with a supporting shaft.

The primary object of my invention is the provision of a gear wheel having a universal or flexible connection with its driving shaft whereby the former may transmit power to a succeeding gear, and the invention is especially adapted to certain types of farm machinery, although of course equally well adapted for numerous other uses.

In the construction of power operated farm machinery, as for instance a combined harvester, the necessity arises for transmitting power from one portion of the machine which may be comparatively stable in its position, to another portion, which latter portion may be movable with relation thereto, as for instance the header and separator portions of the harvester.

By the utilization of my invention the power may be transmitted through a gear couple or train of gears in such manner that a continuous operation will be maintained, especially when the machine is passing over rough or hilly ground.

The invention consists essentially in certain novel combinations and arrangements involving the shaft, a sectional gear and spherical hub portion whereby the gear may wobble within limits on the hub, as will be hereinafter pointed out and claimed.

In the accompanying drawings I have illustrated one complete example of the physical embodiment of my invention wherein the parts of the gear wheel and shaft are combined and arranged according to the best mode I have thus far devised for the practical application of the principles of my invention.

Figure 1 is a view showing the embodiment of the invention, and by dotted lines outlining the limit of movement of the wheel on its hub.

Figure 2 is an enlarged view in side elevation of the sectional wheel, the major portion of one section being broken away, and the hub and shaft shown in cross section, as at line 2—2 of Figure 3.

Figure 3 is a transverse section through the wheel at line 3—3 of Figure 2, showing the squared end of the shaft in longitudinal section.

Figure 4 is a view of the spherical hub member, detached.

Figure 5 is a perspective view of the squared end of the driving shaft, detached.

In the preferred form of the invention as shown in the drawings the gear wheel comprises a pair of sections 1 and 2 that are bolted firmly together at 2' and provided with registering teeth portions forming the gear teeth, and also fashioned with lateral annular flanges 2ª to act as guides for the meshing teeth of a co-acting wheel.

The driving shaft 3 which may be revolved from any suitable source and is properly supported in bearings, is fashioned with a squared end portion or axle 4 to be passed through the spherical hub or head 5 that is fashioned with an opening or socket 6, rectangular in cross section to fit neatly over the axle 4 of the shaft, the axle projecting through the spherical hub as shown in Figure 3. As seen in Figures 5 and 3 the axle is fashioned with four longitudinally extending slots 7 of V-shape extending to a central point in the interior of the shaft end, and adapted to register with complementary slots, four in number, as 8 in the spherical hub. The grooves or slots 7 and the slots 8 when arranged in proper position form a V-shape cavity in the hub and axle, the axes of the four cavities radiating diametrically from the center of the spherical hub and the cavities opening out at the periphery of the hub.

Four diametrically arranged clutch pins are combined with these cavities, each pin comprising an inner section 9 and an outer section 10 joined by a turn buckle 11 connecting their threaded ends and adapted to shorten or lengthen the pins to adapt them or adjust them between the axle, hub and wheel. At their outer ends, each of these diametrically arranged pins is provided with lateral studs 13 projecting from the pins a sufficient distance to pass through short annular slots 14 formed in the sections of the wheel, as shown in Figure 2, thereby anchoring the pins in the wheel. At 12 the two sections of the wheel are recessed to accommodate the pins, and it will be understood that the pins are firmly fixed in the wheel with their inner ends projecting into the narrow cavities which extend around the spherical hub transversely of the gear wheel.

Retaining rings 15 and 16 are attached at the sides of the wheel by means of flanges 17. the latter secured by screws or bolts to the wheel, and the rings, as shown are spherical to conform to the periphery of the hub, with lateral openings to allow the wheel to wobble on the hub as indicated in dotted lines in Figure 1.

As the shaft is revolved, through its squared end the hub also is revolved, and power is transmitted from the hub, through the several radial pins to the wheel sections that are firmly held together, thus revolving the wheel. From the construction shown in Figure 3 it will be apparent that the wheel may wobble on the hub, as indicated in dotted lines Figure 1, still maintaining the driving connection between the hub, pins and wheel, and the retaining rings 16 and 17 will stabilize the movement of the wheel on its hub. The wheel is thus permitted to oscillate longitudinally of the shaft on a center at the longitudinal center of the shaft or its squared end, insuring a correct and mechanical connection between the flexibly mounted wheel and the gear wheel to which it transmits power.

Having thus fully described my invention, what I claim as new and desire to secure by Letters Patent is—

1. The combination with a shaft having a squared end with diametrically arranged grooves therein and a spherical hub on the shaft having complementary slots forming V-shape cavities with the grooves, of a wheel mounted on the hub, and radiating pins carried by said wheel having their inner ends located in said cavities.

2. The combination with a shaft having a squared end and longitudinally extending, diametrically arranged slots therein, of a spherical hub on said squared end having slots to register with said slots to form V-shape cavities, a wheel on said hub having lateral retaining rings, and pins in said wheel projecting into said cavities for the purpose set forth.

In testimony whereof I affix my signature.

JOHN L. FLORIN.